Feb. 15, 1927.
C. P. SHINN
1,617,504
FILTER
Filed April 15, 1926
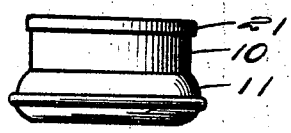
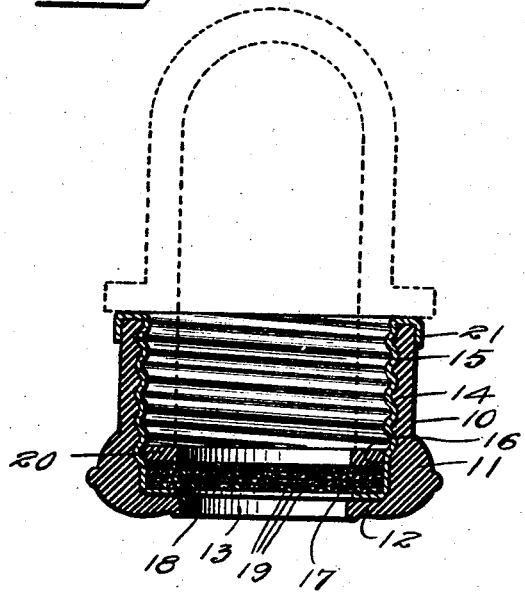
Inventor
C.P. Shinn.
By
Attorney Patented Feb. 15, 1927.

1,617,504

UNITED STATES PATENT OFFICE.

CHARLES P. SHINN, OF NEW YORK, N. Y.

FILTER.

Application filed April 15, 1926. Serial No. 102,265.

This invention relates to new and useful improvements in filters, and particularly to that class of filters which are adapted to be screwed or frictionally slipped onto the mouth of a faucet.

In devices of this character, heretofore, there is provided a molded rubber member within which is snugly fitted a metal shell having threads for engagement with the threaded mouth of a faucet. The upper end of the metal shell is usually sharp and does not make a water-tight joint with the flange of the faucet.

It is the principal object of the present invention to so form the said metal that a perfect joint will be made with the flange of the faucet, and leakage of water therearound effectively prevented.

Another object is to so form this metal shell, and seat the same within the rubber member that all danger of the shell becoming accidentally disengaged therefrom is eliminated.

Other objects and advantages will be apparent from the following description when taken in connection with the accompanying drawing.

In the drawing:

Figure 1 is an elevation of a filter, made in accordance with the present invention.

Figure 2 is a vertical sectional view through the filter, the same being applied to a screw threaded faucet.

Referring particularly to the accompanying drawing, 10 represents a cylindrical rubber shell, the lower portion of the exterior face of which is formed with a circumscribing rib 11, with an inwardly directed horizontal flange 12, at the same end of the shell, forms the wall of the opening 13. The inner face of the rubber shell 10 is formed with thread grooves and ribs 14, which are received in interlocking engagement with the ribs or threads 15, of the metal shell 16, which is snugly fitted within the rubber shell. The lower end of the metal shell is inturned, as at 17, to rest on the ledge formed by the flange 12, of the rubber shell, such inturned portion of the metal shell forming the wall of the opening 18, which registers with the opening 13. Seated on the inturned portion 17 are the filtering screens 19, and disposed on said screens is a rubber ring washer 20, said washer being adapted to be compressed against the lower end of the mouth of the faucet, as shown in Figure 2. The upper edge or end of the metal shell 16 is turned outwardly and downwardly, as shown at 21, and tightly embraces the upper end portion of the rubber shell, whereby the latter is tightly held to the former, and all danger of disengagement of the metal shell, from the rubber shell, is eliminated, the two shells being operable as a unit, without relative movement of either shell.

It will be noted that when the device is screwed up tightly against the flange of the faucet, pressure of the flange against the rounded or bight portion of the turned end of the metal shell will slightly compress said portion whereby to more tightly grip the edge of the shell 10.

There is thus provided a filter which will properly seat against the flange of a faucet to produce a water tight joint, and whereby the metal shell will remain firmly connected with the rubber shell, to prevent separation of the shells.

What is claimed is:

1. A filter for attachment to a faucet comprising an outer rubber shell and an inner metal shell, one end of the inner shell being disposed in embracing engagement with the adjacent end of the outer shell to maintain the shells against separation, the embracing end of the inner shell being adapted to be forced into firm gripping engagement with the outer shell upon engagement with the flange of the faucet.

2. A filter comprising an outer rubber shell and an inner metal shell, the metal shell having threads for engagement with the threaded and flanged end of a faucet, the outer shell having ribs interlocked with the threads of the metal shell, one end of the metal shell being rebent to embrace the adjacent end of the rubber shell whereby to maintain the shells against separation, the curved portion of said rebent end being adapted to be compressed against the flange of the faucet whereby to force said end into firmer engagement with the rubber shell.

In testimony whereof, I affix my signature.

CHARLES P. SHINN.